United States Patent
Rotim et al.

(10) Patent No.: US 11,859,798 B1
(45) Date of Patent: Jan. 2, 2024

(54) PORTABLE LIGHTING DEVICE FOR WORKBENCH

(71) Applicants: Dennis Rotim, Newhall, CA (US); Cvitan Rotim, Newhall, CA (US)

(72) Inventors: Dennis Rotim, Newhall, CA (US); Cvitan Rotim, Newhall, CA (US)

(*) Notice: Subject to any disclaimer, the term of this patent is extended or adjusted under 35 U.S.C. 154(b) by 0 days.

(21) Appl. No.: 18/111,122

(22) Filed: Feb. 17, 2023

(51) Int. Cl.
*F21V 21/10* (2006.01)
*F21V 21/14* (2006.01)
(Continued)

(52) U.S. Cl.
CPC ............ *F21V 21/10* (2013.01); *F21V 21/145* (2013.01); *A47B 2220/0075* (2013.01); *A47B 2220/0077* (2013.01); *B25H 1/02* (2013.01); *F21S 6/002* (2013.01); *F21S 6/003* (2013.01); *F21S 6/005* (2013.01); *F21S 6/006* (2013.01); *F21V 21/14* (2013.01); *F21V 21/26* (2013.01); *F21V 21/28* (2013.01); *F21V 21/29* (2013.01); *F21V 21/30* (2013.01); *G01N 21/01* (2013.01); *G01N 21/8803* (2013.01); *G01N 21/8806* (2013.01); *G01N 2021/8809* (2013.01); *G01N 2021/8812* (2013.01); *G01N 2021/8816* (2013.01);
(Continued)

(58) Field of Classification Search
CPC .. F21S 6/002; F21S 6/003; F21S 6/005; F21S 6/006; F21V 21/14–406; A47B 2220/0075; A47B 2220/0077; G01N 2021/8809; G01N 2021/8812; G01N 2021/8816; G01N 21/01; G01N 21/8803; G01N 21/8806; G01N 2201/022; G01N 2201/02; G01N 2201/021; G01N 2201/0221; G01N 2201/0224; G01N 2201/0225; G01N 2201/024
See application file for complete search history.

(56) References Cited

U.S. PATENT DOCUMENTS

| | | | |
|---|---|---|---|
| 7,517,101 B2 * | 4/2009 | Tobin | A61N 5/0616 607/90 |
| 11,333,336 B1 * | 5/2022 | Tobin | F21V 17/02 |

(Continued)

FOREIGN PATENT DOCUMENTS

CN 108870171 A * 11/2018

OTHER PUBLICATIONS

Youtube.com: "RC Raceworx DAGR Folding Pit Light—RC Racing, Motorsports, Mobile Mechanics and More," https://www.youtube.com/watch?v=7USsDrRRMhM; published Aug. 21, 2022 (Year: 2023).*

(Continued)

*Primary Examiner* — Colin J Cattanach
(74) *Attorney, Agent, or Firm* — Fenwick & West LLP

(57) ABSTRACT

A portable lighting device has an upright configuration and a folded configuration. In the upright configuration, the portable lighting device provides lighting directed to a workspace area. In the folded configuration, the legs of the portable lighting device are rotated into a compact position for transport or storage. The portable lighting device includes lugs to hold one or more objects, which helps increase the surface area of the workspace. The portable lighting device is suitable for different uses of tradespersons and hobbyists. For example, a user can use the portable lighting device while working on radio-controlled car or electrical or hardware repairs.

14 Claims, 4 Drawing Sheets

(51) Int. Cl.
  B25H 1/02   (2006.01)
  G01N 21/01  (2006.01)
  G01N 21/88  (2006.01)
  F21S 6/00   (2006.01)
  F21V 21/30  (2006.01)
  F21V 21/26  (2006.01)
  F21V 21/28  (2006.01)
  F21V 21/29  (2006.01)

(52) U.S. Cl.
  CPC ...  *G01N 2201/02* (2013.01); *G01N 2201/021* (2013.01); *G01N 2201/022* (2013.01); *G01N 2201/024* (2013.01); *G01N 2201/0221* (2013.01); *G01N 2201/0224* (2013.01); *G01N 2201/0225* (2013.01)

(56) References Cited

U.S. PATENT DOCUMENTS

| | | | |
|---|---|---|---|
| 11,598,516 B1* | 3/2023 | Yang | F21V 23/003 |
| 2018/0080640 A1* | 3/2018 | Way | F21S 8/00 |
| 2019/0113464 A1* | 4/2019 | Tingle | G01N 21/8803 |

OTHER PUBLICATIONS

Machine translation of CN 108870171 A retrieved from the FIT database of PE2E search. (Year: 2023).*

* cited by examiner

400

410

PORTABLE LIGHTING DEVICE FOR WORKBENCH

BACKGROUND

Conventional light stands for workbenches are bulky and reduce the available workspace surface area. It is advantageous for a light stand to be portable and increase the workspace surface area, while also providing the desired lighting for the workspace.

SUMMARY

In an embodiment, a portable lighting device comprises an upper structure having a top side and a bottom side. The portable lighting device further comprises a first set of legs coupled to a first side of the upper structure at a first pivot point. The first set of legs includes a first hard stop, where the first set of legs rotates about the first pivot point until the first hard stop contacts the top side of the upper structure in an upright configuration of the portable lighting device. The portable lighting device further comprises a second set of legs coupled to a second side of the upper structure opposite of the first side and at a second pivot point, wherein the second set of legs rotates about the second pivot point until contacting a second hard stop coupled to the top side of the upper structure in the upright configuration. The portable lighting device further comprises a lighting component coupled to the bottom side of the upper structure. Light from the lighting component is directed to an area underneath the upper structure and between the first set of legs and the second set of legs when the portable lighting device is in the upright configuration.

In some embodiments, the upper structure of the portable lighting device comprises two or more horizontal beams coupled to each other, and the lighting component is rigidly coupled to one or more of the two or more horizontal beams. In some embodiments, in a folded configuration of the portable lighting device, the first set of legs is rotated about the first pivot point until the first set of legs is approximately parallel to the two or more horizontal beams, and the second set of legs is rotated about the second pivot point until the second set of legs is approximately parallel to the two or more horizontal beams. In some embodiments, a distance between the first set of legs equals a distance between the second set of legs, and the first set of legs overlaps the second set of legs in the folded configuration of the portable lighting device.

In some embodiments, the upper structure comprises a plurality of lugs configured to hold one or more objects on the top side of the upper structure. In some embodiments, the one or more objects includes a radio-controlled car. In some embodiments, the one or more objects includes a toolbox.

In some embodiments, the first set of legs and the second set of legs include a plurality of feet (such as an L-shaped bracket) to support the portable lighting device in the upright configuration.

In some embodiments, the portable lighting device further comprises: a first pivot mechanism to secure rotation of the first set of legs about the first pivot point; and a second pivot mechanism to secure rotation of the second set of legs about the second pivot point.

BRIEF DESCRIPTION OF DRAWINGS

Figure (FIG.) 1 is an illustration of a portable lighting device in an upright configuration according to an embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. UPRIGHT CONFIGURATION

Figure 1:
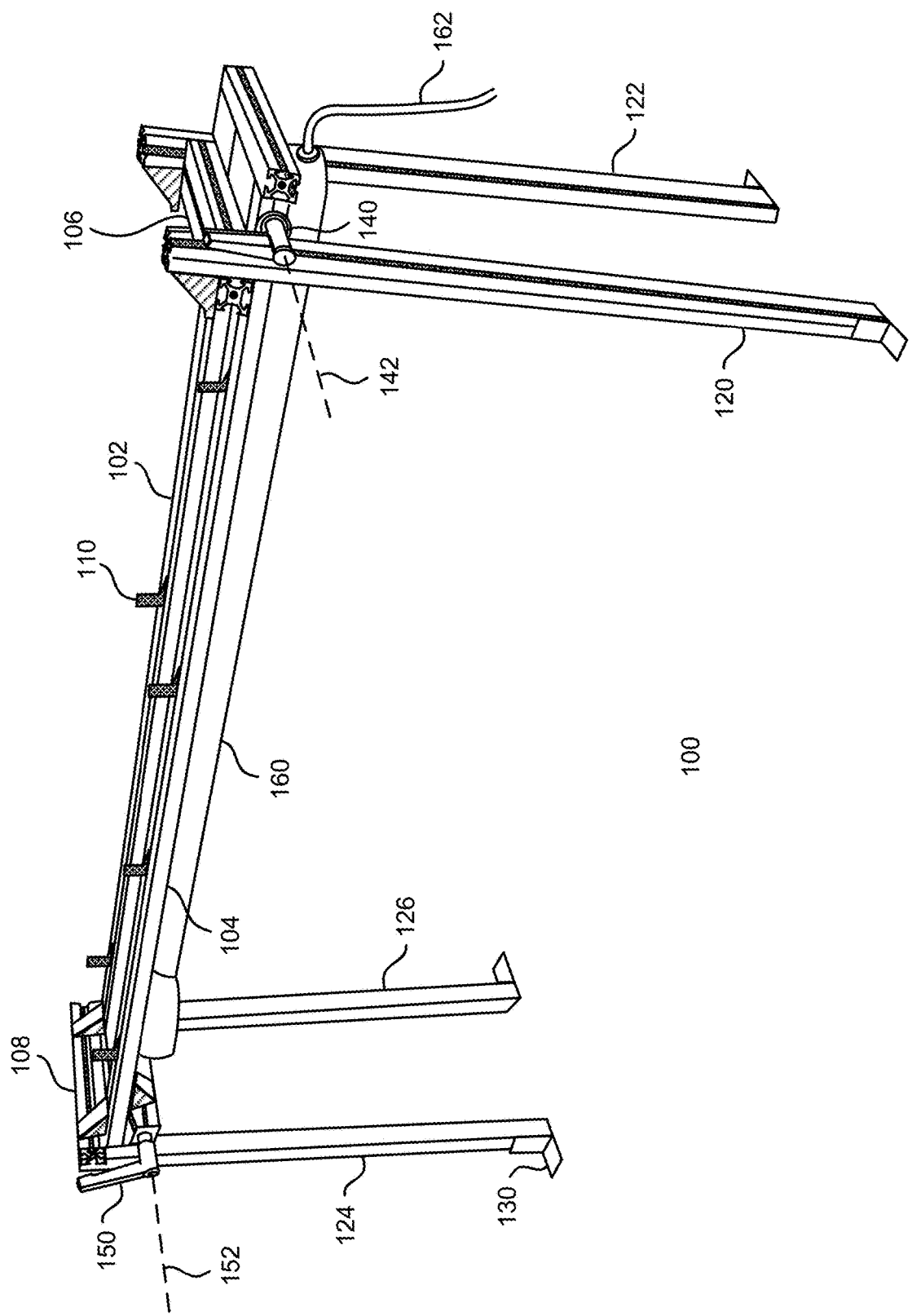

FIG. 1 is an illustration of a portable lighting device 100 in an upright configuration according to an embodiment. The portable lighting device 100 includes an upper structure having a top side and a bottom side. The upper structure includes two or more horizontal beams coupled to each other. The embodiment shown in FIG. 1 includes a first horizontal beam 102 and a second horizontal beam 104 that are parallel to each other. A lighting component 160 is coupled to the bottom side of the upper structure. In some embodiments, the lighting component 160 is rigidly coupled to one or more of the horizontal beams using bolts or other suitable types of fasteners known to one skilled in the art. The position of the lighting component 160 can also be adjustable, e.g., fixed to one of multiple positions. Light from the lighting component 160 is directed to a workspace area underneath the upper structure when the portable lighting device 100 is in the upright configuration. In some use cases, the workspace area can be the surface of a workbench. Since the portable lighting device 100 is portable, the workspace area can also be a different surface such as the ground or on another object.

Example users of the portable lighting device 100 include different types of tradespersons and hobbyists. A tradesperson such as an electrician or mechanic can use the portable lighting device 100 to illuminate an object being built or repaired by the tradesperson. A hobbyist can use the portable lighting device 100 to illuminate an object such as a radio-controlled (RC) car, or a device that needs electrical or hardware repairs. The portable lighting device 100 can be used in both industrial or commercial workspaces (e.g., a machine shop or electronics shop), or residential workspaces (e.g., garage or basement workstation). The portable lighting device 100 can be used indoors or outdoors. In some embodiments, the portable lighting device 100 is up to twenty inches tall in the upright configuration and up to forty-eight inches wide (i.e., the longer length of the upper structure); these dimensions may vary in other embodiments. In some embodiments, the portable lighting device 100 weighs less than five pounds. Thus, the compact nature of the portable lighting device 100—which is described in further detail below with respect to the folded configuration—allows a user to conveniently transport the portable lighting device 100 between different workspaces or storage.

The lighting component 160 can be a LED light or any other suitable type of light known to one skilled in the art. The lighting component 160 includes a cable 162 to a power source such as a standard electrical outlet. In other embodiments, the lighting component 160 is battery powered and does not include a cable 162. In some embodiments, the lighting component 160 includes multiple lighting sub-elements. In some embodiments, multiple lighting components 160 are electrically coupled together. For example, two or more portable lighting devices 100 are positioned adjacent to each other, and the lighting component 160 of each portable lighting device 100 are coupled to the same power source. As a result, this set up of portable lighting devices 100 provides increased lighting for a larger workspace area.

The upper structure includes of lugs 110 configured to hold one or more objects on the top side of the upper structure. This helps increase the available workspace area of the portable lighting device 100. For example, the lugs 110 are positioned to hold a RC car. The distance between the lugs 110 are customized to the dimensions of the RC car (e.g., chassis dimensions) such that the RC car fits snugly and does not shift when placed on the lugs 110. In some embodiments, a user can adjust the position of the lugs 110 based on a specific use case for the portable lighting device 100. For example, the lugs 110 help secure tools or a toolbox while a user works on an object in the workspace area under the lighting component 160. In this way, the tools are readily available to the user and also not obstructing the workspace area under the lighting component 160 when the user is not actively using the tools.

The portable lighting device 100 includes a first set of legs coupled to one side of the upper structure. In the embodiment shown in FIG. 1, the first set of legs includes a first leg 120 and second leg 122. In other embodiments, the first set of legs includes a different number of legs. The first set of legs is coupled to the upper structure at a first pivot point and includes a first hard stop 106. The first set of legs can rotate at the first pivot point, about an axis of rotation 142, until the first hard stop 106 contacts the top side of the upper structure in the upright configuration of the portable lighting device. The portable lighting device 100 includes a first pivot mechanism 140 at the first pivot point. As illustrated in FIG. 1, when the first hard stop 106 contacts the top side of the upper structure, the first set of legs is perpendicular, or approximately perpendicular, to the first horizontal beam 102 and second horizontal beam 104.

The portable lighting device 100 includes a second set of legs coupled to another side of the upper structure opposite of the first side and at a second pivot point. In the embodiment shown in FIG. 1, the second set of legs includes a first leg 124 and second leg 126. In other embodiments, the second set of legs includes a different number of legs, which may be different than the number of legs in the first set of legs. The second set of legs can rotate at the second pivot point, about an axis of rotation 152, until the second set of legs contacts a second hard stop 108 coupled to the top side of the upper structure. The portable lighting device 100 includes a second pivot mechanism 150 at the second pivot point. As illustrated in FIG. 1, in the upright configuration when the second set of legs contacts the second hard stop 108, the second set of legs is perpendicular, or approximately perpendicular, to the first horizontal beam 102 and second horizontal beam 104.

In some embodiments, the first set of legs and the second set of legs include feet 130 to support the portable lighting device 100 in the upright configuration. In the embodiment shown in FIG. 1, each leg of the first and second set of legs includes an "L" shaped bracket as one of the feet 130, which increases the surface area of contact between the legs and the workspace surface area, and thus improves the stability of the portable lighting device 100. The bottom portion of the feet 130 contacting the workspace may comprise rubber or another type of material to provide greater friction with to the workspace surface area. In other embodiments, the feet 130 have a different form factor. The feet 130 can have variations (e.g., different size or shape) across the legs, and some legs may not include feet in some embodiments.

In some embodiments, the first set of legs, second set of legs, and upper structure are formed with one or more segments of metal extrusions, e.g., aluminum extrusions or an alloy. This provides a strong yet lightweight material for the portable lighting device 100. In other embodiments, one or more of these structural components are formed with other types of material such as carbon fiber. In the example shown in FIG. 1, the first horizontal beam 102 and second horizontal beam 104 are each formed with a metal extrusion. The first horizontal beam 102 and second horizontal beam 104 are coupled together at both ends with additional metal extrusions that are perpendicular to the horizontal beams. The first hard stop 106 and second hard stop 108 are also each formed with a metal extrusion. These metal extrusions can be welded together or rigidly coupled using one or more types of fasteners such as nuts and bolts. In embodiments with fasteners, the dimensions of the portable lighting device 100 may be adjusted by interchanging the metal extrusions to smaller or larger sizes, in order to customize the device for a specific use case.

II. FOLDED CONFIGURATION

Figure 2:
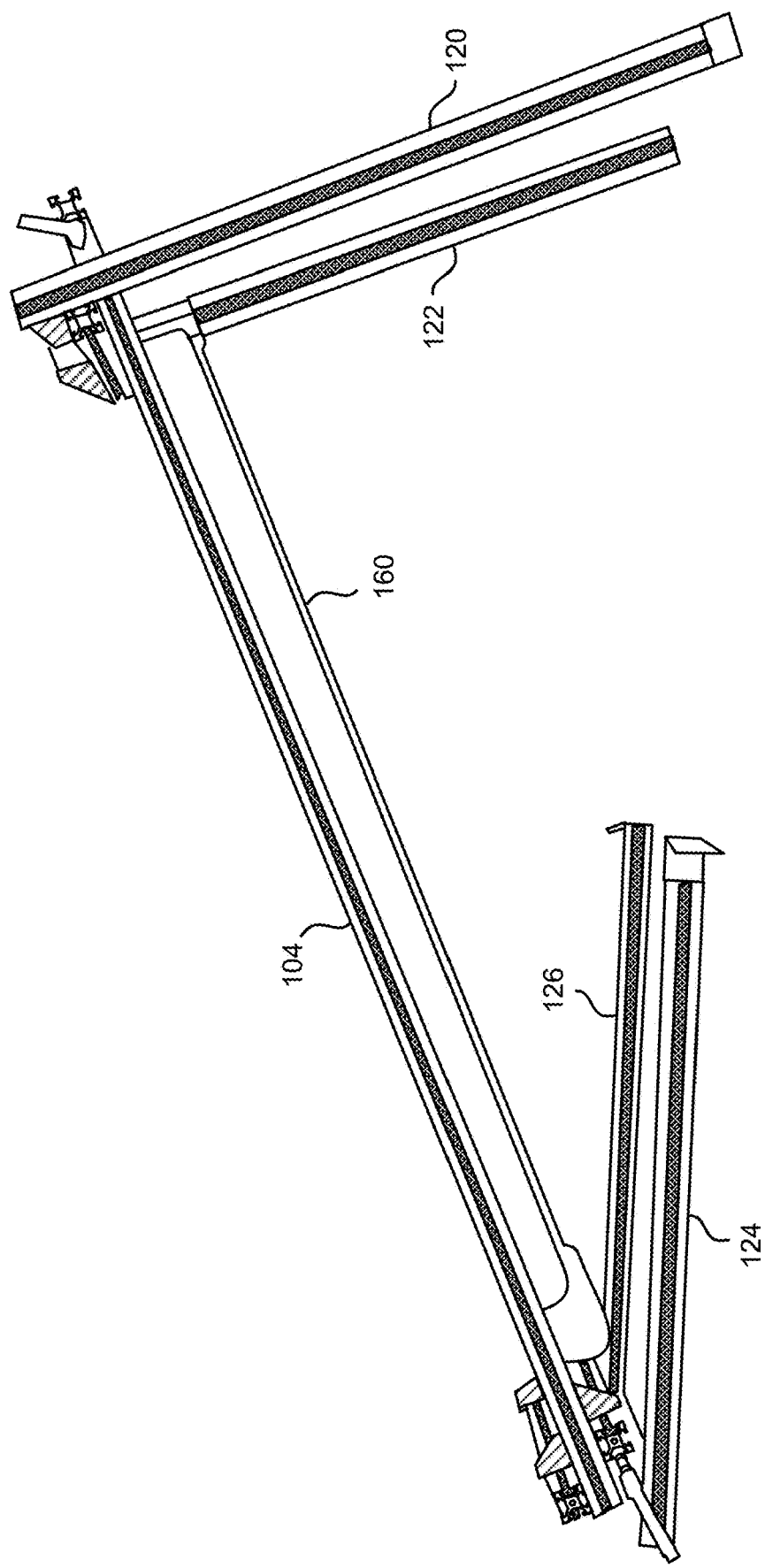
FIG. 2 is an illustration of the portable lighting device shown in FIG. 1 transitioning from the upright configuration to a folded configuration according to an embodiment.

FIG. 2 is an illustration of the portable lighting device 100 shown in FIG. 1 transitioning from the upright configuration to a folded configuration according to an embodiment. As shown in the side view of FIG. 2, the second set of legs (124 and 126) are partially folded inward toward the lighting component 160.

Figure 3:
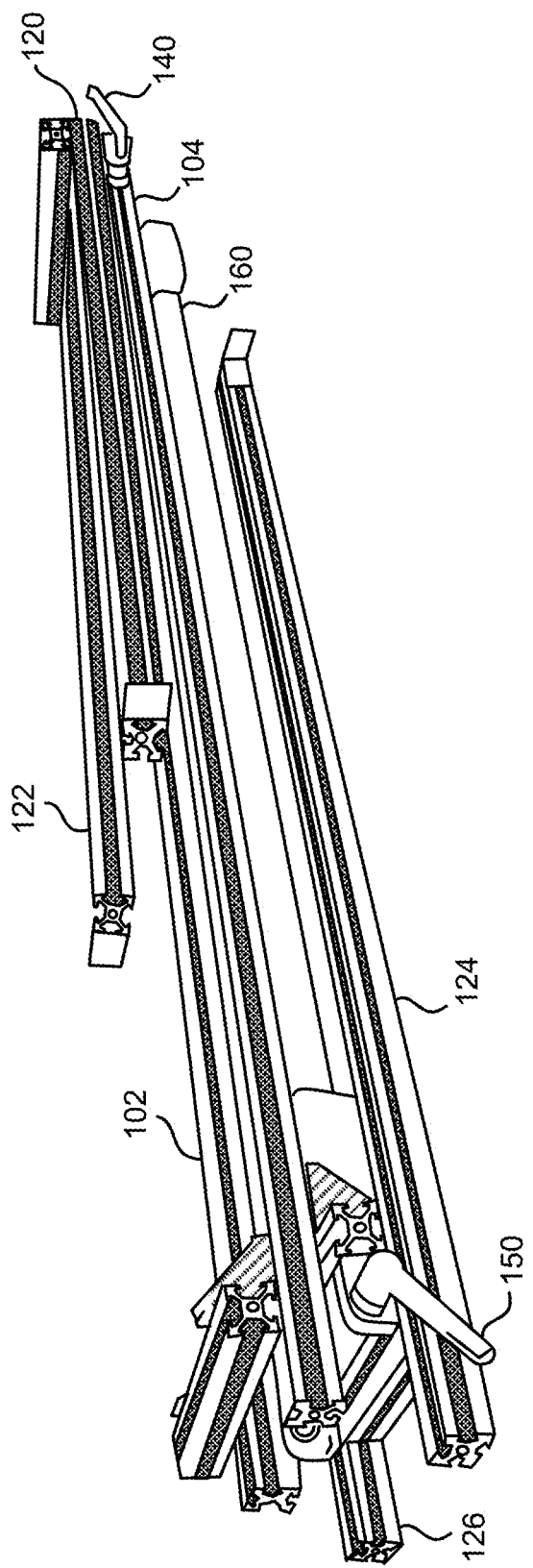
FIG. 3 is an illustration of the portable lighting device shown in FIG. 1 in the folded configuration according to an embodiment.

FIG. 3 is an illustration of the portable lighting device shown 100 in FIG. 1 in the folded configuration according to an embodiment. As shown in FIG. 3, the second set of legs (124 and 126) are folded to be approximately parallel to the first horizontal beam 102 and second horizontal beam 104 of the upper structure. And the first set of legs (120 and 122) are folded to be approximately parallel to the first horizontal beam 102 and second horizontal beam 104 of the upper structure.

The first set of legs and second set of legs can be folded without interfering with each other because these sets of legs have asymmetric spacing. As shown in FIG. 3, the first set of legs and second set of legs are secured in offset positions in the folded configuration. Specifically, the first set of legs are secured above the upper structure, while the second set of legs are secured below the upper structure. As a result, the first set of legs do not interfere with the second set of legs even though the sum of the lengths of the first set of legs and second set of legs is greater than the length of the upper structure. The asymmetric spacing accommodates this partial overlap of the lengths of the legs, while still maintaining a folded configuration that is compact for storage. In other embodiments, the length of the legs may be shorter or longer than the lengths shown in FIG. 3. Regardless of the length of the legs, the asymmetric spacing prevents the legs from interfering with each other in the folded configuration.

In some embodiments, the distance between the first leg 120 and second leg 122 (of the first set of legs) is the same as the distance between the first leg 124 and second leg 126 (of the second set of legs). Without the asymmetric spacing described above, the legs may interfere with each other when folded if the distances between the two sets of legs are equal. Thus, the asymmetric spacing of the legs is advantageous for this additional reason.

Figure 4:
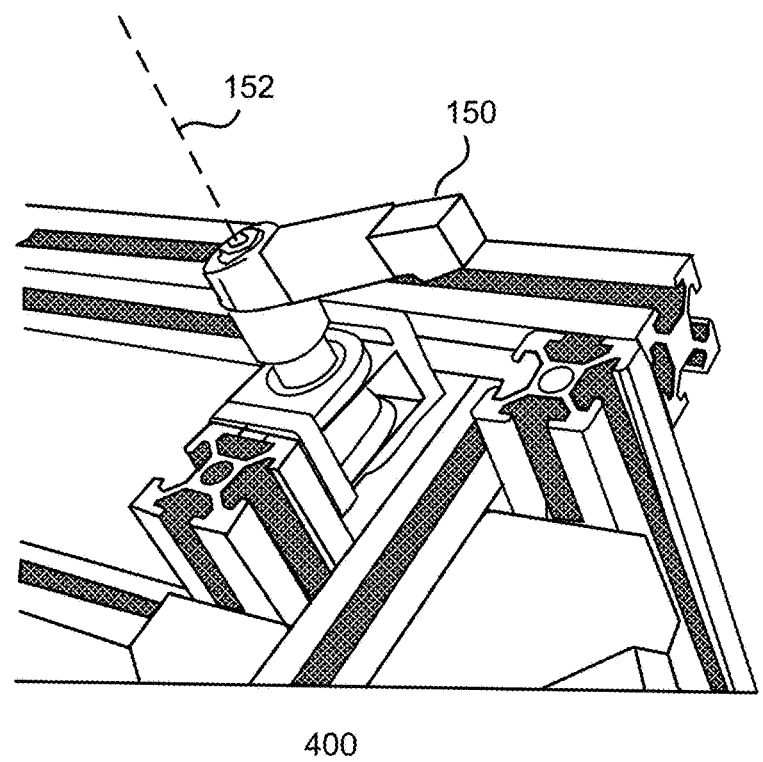
FIG. 4 is an illustration of a pivot mechanism of the portable lighting device according to an embodiment.
Figure 4:
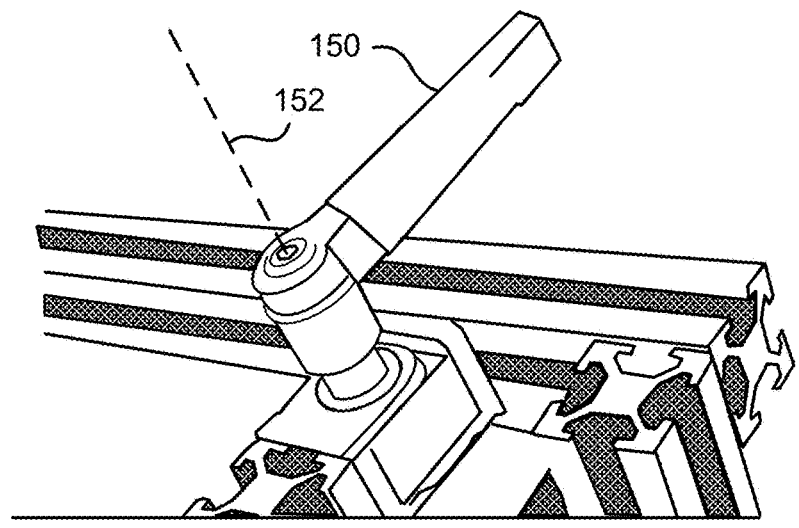

FIG. 4 is an illustration of a pivot mechanism of the portable lighting device 100 according to an embodiment. As previously discussed with reference to FIG. 1, the portable lighting device 100 includes a first pivot mechanism 140 and second pivot mechanism 150. The first pivot mechanism 140 secures rotation of the first set of legs about the first pivot point. The second pivot mechanism 150 secures rotation of the second set of legs about the second pivot point. In FIG. 4, the upper diagram 400 illustrates the second pivot mechanism 150 in a secured configuration, and the bottom diagram 410 illustrates the second pivot mechanism 150 in a released configuration. When the pivot mechanisms are in the secured configuration, the portable lighting device 100 is secured in either the upright configuration or folded configuration, such that the legs cannot rotate. When the pivot mechanisms are in the released configuration, a user can rotate the legs to transition the portable lighting device 100 from the upright configuration to the folded configuration, or vice versa.

The pivot mechanism includes a lever to secure and release the legs for rotation. A user manually operates the lever. In some embodiments, the pivot mechanism includes a greased bearing, which mitigates wear and tear on the pivot mechanism over repeated rotations. In some embodiments, the pivot mechanism includes a rubber-on-rubber bushing to avoid metal-on-metal contact, which may result in greater wear and tear.

V. ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A portable lighting device comprising:
   an upper structure having a top side and a bottom side and comprising two or more horizontal beams rigidly coupled to each other;
   a first set of legs coupled to a first side of the upper structure at a first pivot point and including a first hard stop, wherein the first set of legs rotates about the first pivot point until the first hard stop contacts the top side of the upper structure in an upright configuration of the portable lighting device;
   a second set of legs coupled to a second side of the upper structure opposite of the first side and at a second pivot point, wherein the second set of legs rotates about the second pivot point until contacting a second hard stop coupled to the top side of the upper structure in the upright configuration; and
   a lighting component coupled to the bottom side of the upper structure, wherein light from the lighting component is directed to an area underneath the upper structure and between the first set of legs and the second set of legs when the portable lighting device is in the upright configuration,
   wherein, in a folded configuration of the portable lighting device, the first set of legs is rotated about the first pivot point until the first set of legs is approximately parallel to the two or more horizontal beams, and the second set of legs is rotated about the second pivot point until the second set of legs is approximately parallel to the two or more horizontal beams, and
   wherein the second pivot point remains at a fixed distance from the first pivot point when the portable lighting device changes from the upright configuration to the folded configuration.

2. The portable lighting device of claim 1, wherein the lighting component is rigidly coupled to one or more of the two or more horizontal beams.

3. The portable lighting device of claim 1, wherein a distance between the first set of legs equals a distance between the second set of legs, and wherein the first set of legs overlaps the second set of legs in the folded configuration of the portable lighting device.

4. The portable lighting device of claim 1, wherein the upper structure comprises a plurality of lugs configured to hold one or more objects on the top side of the upper structure.

5. The portable lighting device of claim 4, wherein the one or more objects includes a radio-controlled car.

6. The portable lighting device of claim 4, wherein the one or more objects includes a toolbox.

7. The portable lighting device of claim 1, wherein the first set of legs and the second set of legs include a plurality of feet to support the portable lighting device in the upright configuration.

8. The portable lighting device of claim 7, wherein the plurality of feet each comprise an L-shaped bracket.

9. The portable lighting device of claim 1, further comprising:
   a first pivot mechanism to secure rotation of the first set of legs about the first pivot point; and
   a second pivot mechanism to secure rotation of the second set of legs about the second pivot point.

10. The portable lighting device of claim 1, wherein the upper structure, the first set of legs, and the second set of legs each comprise one or more metal extrusions.

11. The portable lighting device of claim 1, wherein the upper structure, the first set of legs, and the second set of legs are each formed using carbon fiber.

12. The portable lighting device of claim 1, wherein a length of the portable lighting device is up to forty-eight inches and a weight of the portable lighting device is up to five pounds.

13. The portable lighting device of claim 1, wherein a height of the portable lighting device is up to twenty inches in the upright configuration.

14. The portable lighting device of claim 1, wherein the lighting component is electrically coupled to one or more other lighting components.

* * * * *